United States Patent
Brunheroto et al.

(10) Patent No.: US 7,908,439 B2
(45) Date of Patent: Mar. 15, 2011

(54) METHOD AND APPARATUS FOR EFFICIENT REPLACEMENT ALGORITHM FOR PRE-FETCHER ORIENTED DATA CACHE

(75) Inventors: Jose R. Brunheroto, Mohegan Lake, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 11/767,717

(22) Filed: Jun. 25, 2007

(65) Prior Publication Data
US 2008/0320228 A1 Dec. 25, 2008

(51) Int. Cl.
G06F 12/00 (2006.01)
(52) U.S. Cl. .................................. 711/137; 711/133
(58) Field of Classification Search ............... 711/133, 711/137
See application file for complete search history.

(56) References Cited

U.S. PATENT DOCUMENTS

| | | | |
|---|---|---|---|
| 5,530,823 A | 6/1996 | Tsuchiya et al. | |
| 5,944,815 A * | 8/1999 | Witt ........................... | 712/207 |
| 6,397,296 B1 * | 5/2002 | Werner ....................... | 711/122 |
| 7,103,748 B2 | 9/2006 | Day et al. | |
| 2004/0133760 A1 | 7/2004 | Thimmannagari | |
| 2006/0112229 A1 * | 5/2006 | Moat et al. ................. | 711/137 |
| 2006/0179239 A1 * | 8/2006 | Fluhr et al. ................. | 711/137 |
| 2007/0050594 A1 | 3/2007 | Augsburg et al. | |
| 2007/0083714 A1 * | 4/2007 | Henry et al. ................ | 711/137 |

OTHER PUBLICATIONS

"Blue Gene/L compute chip: Memory and Ethernet", published in IBM Journal of Research and Development, 49(2/3), 2005, by M. Ohmacht, R.A. Bergamaschi, S. Bhattacharya, A. Gara, M.E. Giampapa,B. Gopalsamy, R.A. Haring, D. Hoenicke, D.J. Krolak, J.A. Marcella, B.J. Nathanson, V. Salapura and M.E. Wazlowski.

* cited by examiner

*Primary Examiner* — Shane M Thomas
(74) *Attorney, Agent, or Firm* — Scully, Scott, Murphy & Presser, P.C.; Derek S. Jennings

(57) ABSTRACT

Disclosed are a method and apparatus for replacing pre-fetched data in a pre-fetch cache. In one embodiment, each line of the pre-fetch cache will be accessed at most M times. A line accessed M times can be evicted from the cache without any performance loss. In this embodiment, a counter is added to each pre-fetch data line to track how many times it has been accessed. In another embodiment, a displacement bit is added to each pre-fetch data line, and when a defined portion of the data line is accessed, this bit is set to a given value, indicating that the line can be evicted.

4 Claims, 5 Drawing Sheets

METHOD AND APPARATUS FOR EFFICIENT REPLACEMENT ALGORITHM FOR PRE-FETCHER ORIENTED DATA CACHE

BACKGROUND OF THE INVENTION

1. Field of the Invention

The present invention generally relates to microprocessors and to multiprocessor architectures and, more particularly, to architectures with data caches implementing data prefetching.

2. Description of the Prior Art

Future microprocessor designs will require new design trade-offs to address new constraints on architectures. The increasing computer power available per chip with the use of chip multiprocessors is not matched by a commensurate increase in signal I/O bandwidth to satisfy the inherent memory bandwidth requirements, leading to a potentially unbalanced and inefficient design.

At the same time, the use of SRAM memories as on-chip memories to provide a significant reduction in bandwidth requirements is limited by its comparatively low density and power dissipation. SRAM memories are also suffering from manufacturability constraints limiting future access speeds.

A promising solution to these multiple constraints is the adoption of embedded DRAM techniques for high-capacity, high-density on-chip caches. Embedded DRAM (eDRAM) uses logic fabrication technology to build the familiar IT DRAM cell in a logic process, offering a significant increase in capacity per given unit area. While eDRAM offers attractive density and capacity per unit area, it has higher latency compared to SRAM-based on-chip solutions.

By using eDRAM in conjunction with chip-multiprocessor solutions, it is possible to deliver increased performance with reduced memory bandwidth requirements, and to offer attractive system solutions transcending the constraints of current technology. Integrating large capacity eDRAM caches on chip makes high bandwidth access to high capacity on-chip storage a reality by offering both wide data paths, and higher on-chip transfer speeds.

To deliver on the promise of this new memory hierarchy paradigm, prefetching may be used to decouple application access latency from the technology, and the available bandwidth may be used for latency hiding. To avoid the area cost and constraints imposed on SRAM in future technologies, efficient prefetch cache architecture may be used. As an example, the BlueGene/L system, which uses eDRAM for on-chip cache and prefetch caches, is described in "Blue Gene/L compute chip: Memory and Ethernet", published in IBM Journal of Research and Development, 49(2/3), 2005 by M. Ohmacht, R. A. Bergamaschi, S. Bhattacharya, A. Gara, M. E. Giampapa, R. Gopalsamy, R. A. Haring, D. Hoenicke, D. J. Krolak, J. A. Marcella, B. J. Nathanson, V. Salapura, and M. E. Wazlowski.

In the BlueGene/L compute chip, instead of using standard L2 SRAM-base cache, a small private prefetch cache is integrated in the memory hierarchy between a first level private 32 KB data cache, and a 3rd level on-chip 4 MB eDRAM cache shared between two processor cores on a chip. A small private prefetch cache is implemented between small private L1 caches and large L3 eDRAM shared between two processors. The prefetch cache's size is only 2 kB per processor.

The idea of prefetching data to improve data cache hit rate by fetching data from the memory before the processor actually needs them is widely employed and explored. The underlying idea is to overlap memory access time with computation, and thus to improve processor performance by reducing the number of stall cycles. Ideally, only data which are needed are prefetched ahead of time so they are ready to use when the processor needs them. By prefetching too many unneeded data into the prefetch cache, available memory bandwidth for other participants on the memory bus is reduced, and the prefetch cache gets polluted where prefetched data can displace useful data from the cache. These problems are even more pronounced for smaller prefetch data caches.

To ensure efficient use of a small prefetch cache, the careful management of the prefetch cache is extremely important. For optimal performance, the prefetched cache lines placed in the L2 prefetch cache should not displace some other cache line which is still in use by the processor. Which line to displace from the prefetch cache is determined by the prefetch cache replacement policy.

The replacement policy captures reference behavior and helps to determine how data streams are aged out of the prefetch cache to make room for new data lines. There is a number of different standard replacement policies available, such as random, round-robin, some variants of round-robin, and least recently used (LRU), to name a few.

Whereas some of the replacement policies are simple to implement in hardware—such as random or round-robin—these approaches have a disadvantage that they can displace lines from the prefetch cache that are still in use by the processor. Similarly, these policies could displace lines allocated in the prefetch cache for recently issued prefetch requests to the L3 and for which data are still in-flight from the L3 cache.

Alternatively, some of the replacement policies deliver good performance—such as LRU replacement policy—but result in complex hardware implementation requiring many resources, and as a consequence, increasing the power consumption of the circuitry.

The replacement policy employed for efficient management of a prefetch data cache determines the prefetch cache performance and the complexity of the prefetch cache design. It would be highly desirable to provide a replacement policy for a prefetch cache system which would enable high performance of the prefetch cache—expressed as high cache hit rate—and at the same time, can be implemented by a replacement mechanism that is not complex.

SUMMARY OF THE INVENTION

An object of the invention is to provide a prefetch cache replacement policy of high efficiency and low hardware complexity.

Another object of the present invention is to ensure high effectiveness in prefetch cache line replacement management, resulting in high prefetch cache hit rate.

This invention provides a method and apparatus for prefetch cache replacement policy of high efficiency and low hardware complexity. The prefetch cache is placed in the memory hierarchy to hide latency of the lower level cache eDRAM-based memory hierarchy to the processor in a multiprocessor system. The prefetch cache fetches data from the system memory before the processor actually needs them by overlapping memory access time with computation, thus improving processor performance.

Ideally, only data which are needed are fetched ahead of time. If too many unneeded data are prefetched into the prefetch cache, the data still needed by a processor could be displaced from the prefetch cache, or requested data which are still in flight could be displaced. In addition, too many unneeded prefetching requests reduce available memory bandwidth for other processors on the memory bus.

Careful management in replacing the lines from the prefetch cache determines the effectiveness of the prefetch cache, and ultimately, the efficiency of the whole memory subsystem. An aspect of this invention is directed to a method for efficient cache replacement policy. The proposed replacement method is simple for implementing in hardware, requiring only a few bits of information associated to each prefetch cache line. The described replacement policy ensures high effectiveness in line replacement management, reflected in high prefetch cache hit rate.

The preferred embodiment of the invention is effective for prefetch cache lines being wider than the processor's L1 cache lines, thus holding wide L3 cache lines. Each line buffer having M L1 data cache lines will be accessed at most M times. A line accessed M times will not be accessed any more, and thus can be evicted without any performance loss. In accordance with one embodiment of the invention, a counter is added to each prefetch line to track how many times it has been accessed. A line accessed N times is marked for displacement.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
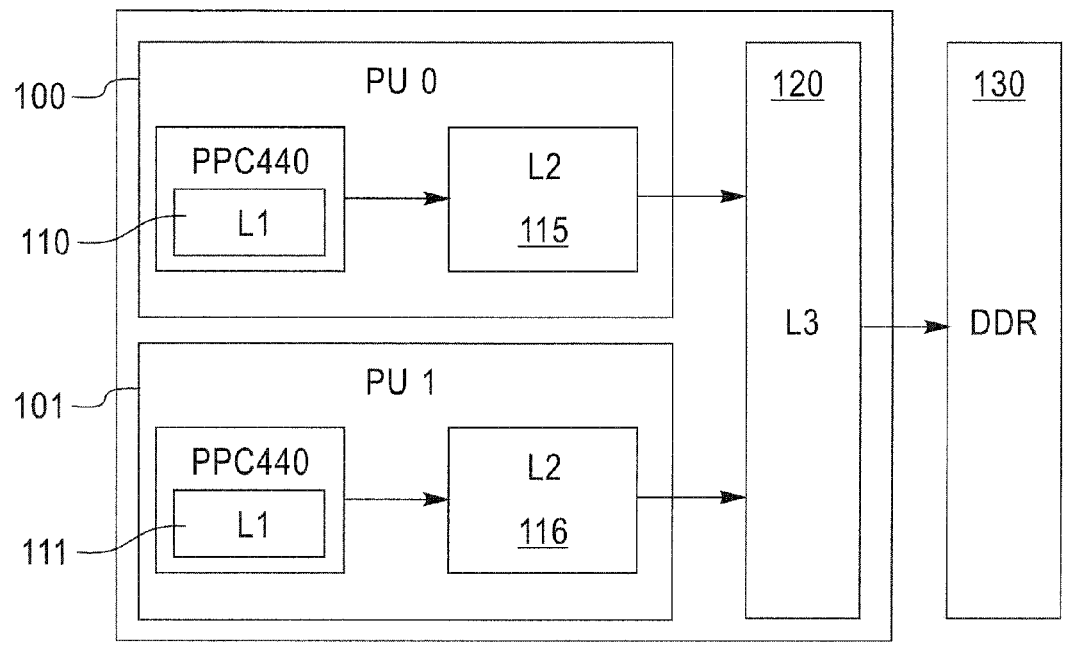
FIG. 1 is a circuit block diagram depicting a base multi-processor architecture with its memory subsystem comprised of L1 private caches, a shared L3 cache based on eDRAM, and prefetch L2 caches.

With reference to the accompanying drawings, FIG. 1 illustrates a schematic diagram of the overall base architecture of the multiprocessor system. The system is comprised of two processor cores CPU0 and CPU1, labeled 100 and 101, respectively, each with associated local L1 level data and instruction caches, labeled 110 and 111, and private L2 prefetch caches 115, 116. Both processors are connected to the wide eDRAM based L3 cache 120. L3 cache interfaces main memory 130. In the example shown in FIG. 1, this main memory is a double-clocked DRAM (DDR)

The prefetch caches contain a number of wide lines fetched from L3. The data line of the L2 cache matches the width of the L3 cache. Each L2 line is an integer multiple of narrow L1 cache lines. A fetched line from the L3 cache is stored in the L2 cache, and a subset of the fetched data line is forwarded to the L1 cache on each L1 cache miss which hits in the L2 cache. A data line is kept in the L2 until the line is evicted or invalidated.

On each L1 cache miss, the L2 cache directory is checked. If the requested data are already available in the L2 cache, it is copied to the L1 data cache. If the requested data are not in the L2 cache, a new request to the L3 is generated. The requested L3 cache line is fetched from the L3, and only the portion corresponding to the requested L1 cache line is forwarded to the L1 cache.

In another embodiment of the invention, only one processor is interconnected with the small L2 prefetch cache, L3 cache, and main memory. In yet another embodiment, N processors, with N>2 are connected in a computing system. In yet another embodiment, processors in the processor system are heterogeneous. In yet another embodiment, L3 cache is not eDRAM based, but is external to the processor chip. In yet another embodiment, the invention may be practiced without requiring that L2 implement or utilize prefetching. In yet another embodiment, L2 caches are interconnected via a bus or a switch. Those skilled in the art will understand that additional embodiments within the scope of the invention may be practiced.

Figure 2:
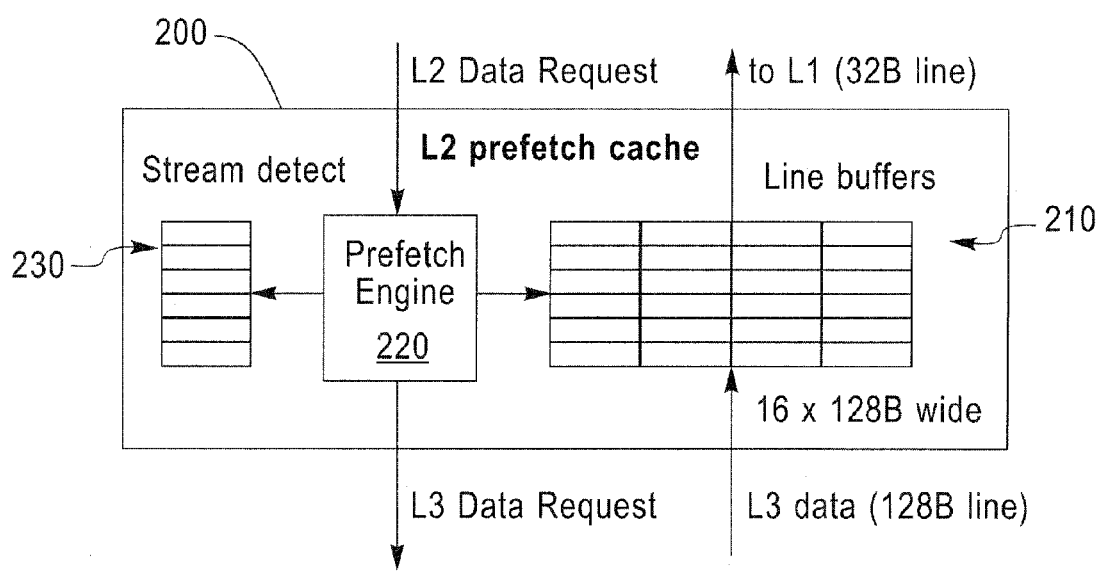
FIG. 2 is a circuit block diagram depicting a preferred embodiment of the prefetch L2 cache.

Referring now to FIG. 2, a schematic diagram of the overall architecture of the preferred prefetch L2 cache is illustrated. The prefetch L2 cache 200 is comprised of the following several components: line buffers 210 that provide storage for demand-fetched and pre-fetched cache lines from eDRAM L3; a prefetch engine 220 to initialize prefetches, calculate/predict the prefetch address, and selects which line buffer to replace, and stream detector buffers 230 that detect reference patterns corresponding to data streams.

On each L1 cache miss, the prefetch L2 cache directory is checked. If the requested data is already available in the prefetch L2 cache, that data are forwarded to the L1 data cache, and the data's L2 tag (L2 tag being reflective of the L2 cache line size) is stored in the stream detection buffers 230. If the L2 tag of the requested address matches an L2 tag already stored in the stream detection buffers, a prefetch stream is established.

When a prefetch stream is established, the first subsequent access to data resident in the L2 line buffers 210 triggers a prefetch request to be issued. In a prefetch request, one prefetch line (corresponding in size to four L1 cache lines) is fetched from the L3 cache and stored in the prefetch cache.

For an L1 cache miss, which also misses in the prefetch L2 cache for which no prefetch stream is established, the requested L3 cache line is fetched from the L3, and only the portion corresponding to the requested L1 cache line is forwarded to the L1 cache without storing the fetched L3 data line in a line buffer 210. The line buffers are managed as a fully associative cache. Once prefetched, the lines reside in the prefetch cache as long as no other request evicts or invalidates the entry.

In an alternative embodiment, prefetch L2 cache does not include stream detection buffers, but instead uses the L2 cache directory for detecting data streams. In this embodiment, the prefetch L2 cache directory is checked on each L1 cache miss. If the requested data are available in the prefetch L2 cache 200, that data are forwarded to the L1 data cache. The next request to the same line in the L2 line buffers 210 triggers a prefetch request to be issued. In a prefetch request, one prefetch line (corresponding in size to four L1 cache lines) is fetched from the L3 cache and stored in the prefetch cache L2.

For L1 cache misses which also miss in the prefetch L2 cache, an L3 request is issued. The requested L3 cache line is fetched, the portion corresponding to the requested L1 cache line is forwarded to the L1 cache, and the fetched L3 data line is stored in a line buffer 210. If the requested data are already available in the prefetch L2 cache, that data are forwarded to the L1 data cache.

In yet another embodiment, an alternative prefetching mechanism is implemented. In yet another embodiment, the prefetch engine can detect both ascending and descending data streams. In yet another embodiment, the prefetch engine can detect only descending streams. In yet another embodiment, the prefetch engine implements a strided stream pattern, for some programmable stride. Those skilled in the art will understand that additional implementations within the scope of the invention may be practiced.

The line to be evicted from the cache is selected by its replacement policy. Typically employed in the caches are: LRU (least recently used), random, round-robin, RRMU (round robin with skipping several most recently used). The goal is to minimize the cache miss rate. Depending on the replacement policy, the cache has different miss rates for the same application. Depending on the cache replacement policy, it can happen that a cache line with data, which are needed by the processor, is evicted. Alternatively, a line kept in the prefetch cache, which will not be used by the processor any more, can be kept in the prefetch cache due to the replacement policy. The implemented replacement policy for allocating cache line to new requests has an impact on the performance of the processor system.

Figure 3:
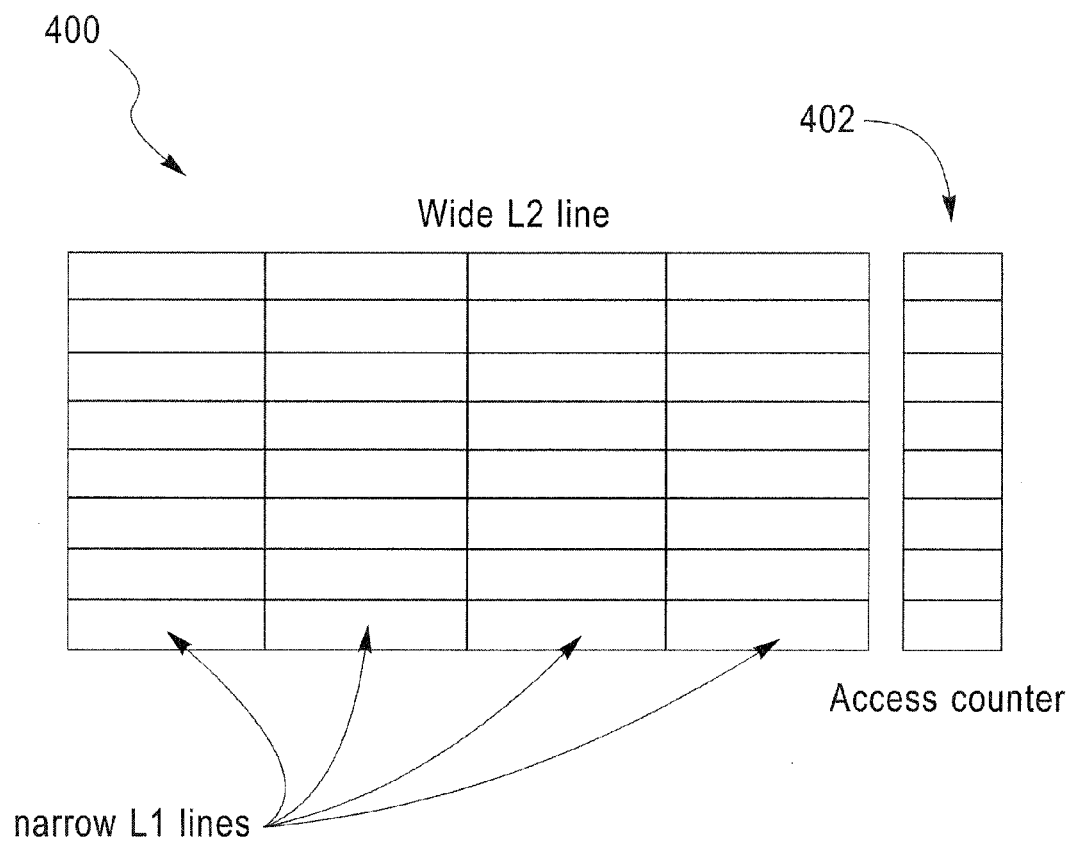
FIG. 3 is a block diagram depicting a preferred embodiment of the prefetch cache with counters for each line of the prefetch cache.

Referring now to the FIG. 3, the preferred embodiment of the invention is depicted. To each cache line in the prefetch cache 400 is added an access counter 402. Each cache line having M L1 data cache lines will be accessed at most M times. A line accessed M times will not be accessed any more, and this line can be evicted without any performance loss. The access counter is incremented each time the adjoin cache line is accessed. When the access counter reaches the number M, where M is the number of L1 data cache lines contained in a single prefetch cache line, this line can be evicted out of the prefetch cache without any performance loss. Thus, the next time a new request is generated, and a cache line has to be allocated for new data, a line whose counter has value M can be replaced.

In an alternative embodiment, instead of selecting a line whose adjoin counter has value M for eviction, a cache line with an access counter having value N, where N<M is selected. To each line, a counter is added to track how many times a line is accessed. By adding a counter to each cache line to track how many times it has been accessed, a line detected as being accessed N times is evicted. Reaching N indicates that this line will not be used any more. N can be selected statistically, by collecting statistics when executing a set of benchmarks or applications. For N, the average number of accesses to a cache line can be selected, or some other number can be selected. Some other approach to determine the number N can be used without departing from the scope of this invention.

In one embodiment, N has a hard-coded value in hardware. In another embodiment, N can be selected programmably, and can be written in a register. In yet another embodiment, a hardware stream detection engine can determine N.

Figure 4:
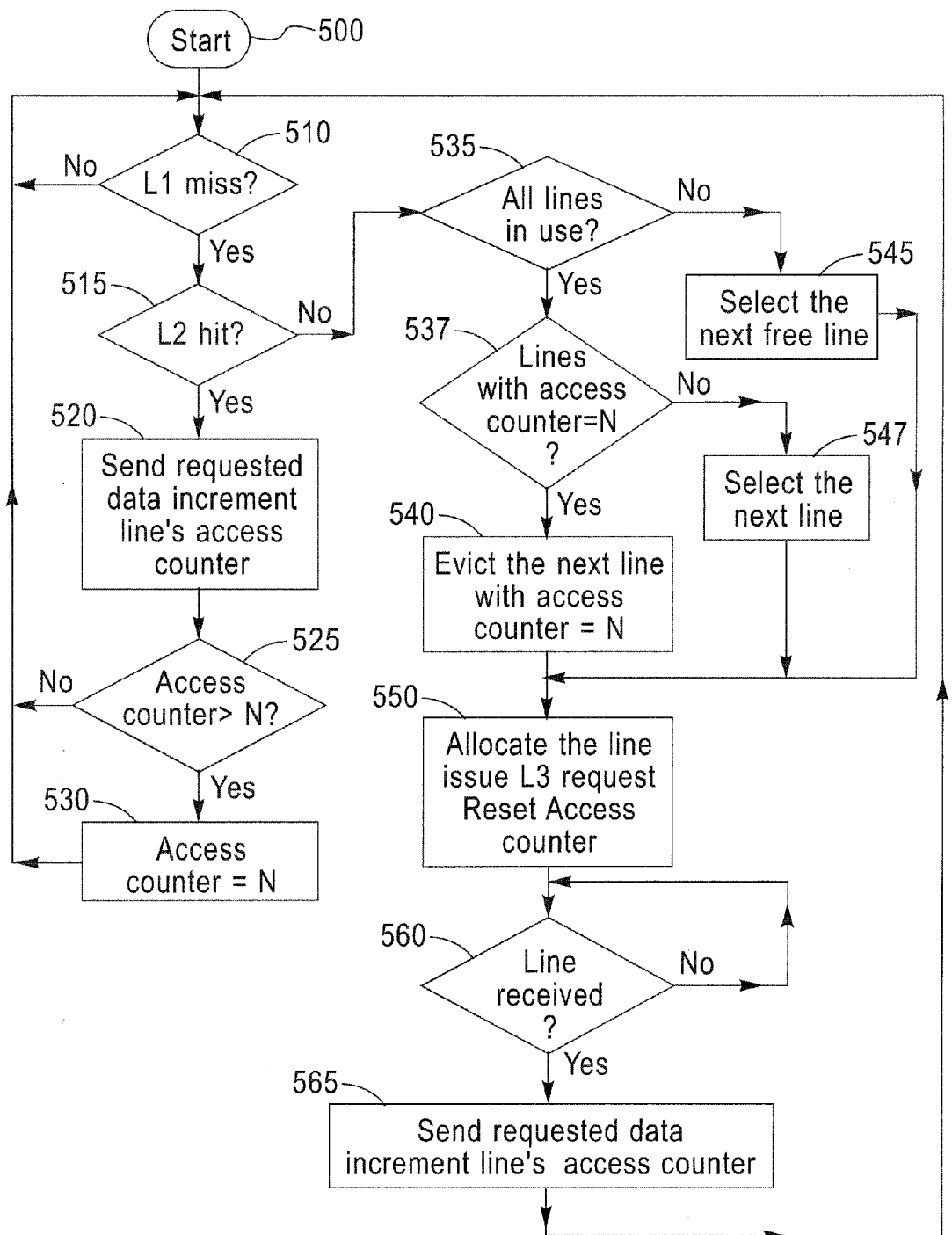
FIG. 4 depicts a flow chart for managing cache line accesses and updating access counters in accordance with a preferred embodiment of the invention.

Referring now to FIG. 4, the flow chart depicts the replacement policy using access counters according to the present invention. At the start of operation at step 500, the prefetch cache waits for L1 cache misses in the step 510. The control stays in this state, until there is a L1 cache miss, when the execution proceeds to step 515.

In step 515, it is checked if the requested data are located in the prefetch cache. If requested data are located in the L2 prefetch cache, the execution continues to step 520. The requested L1 cache line is sent to the L1 data cache, and the access counter of the prefetch cache line is incremented. The access counter counts from 0 to some number N. The access counter is saturating, as specified by steps 525 and 530, so that the value in the counter never exceeds the value N. Once the access counter is incremented, the control loops back to the step 510 to wait for the next L1 data cache miss.

Going back to step 515, if requested data are not located in the prefetch cache, i.e., if this was an L2 miss, the execution proceeds to step 535 to determine if all prefetch cache lines are in use. If an unused cache line is available in the prefetch cache, the first next free cache line is selected in step 545, and the execution continues to step 550.

If all cache lines are in use, one of the used cache lines has to be evicted. Ideally, evicted is the cache line which will not be used any more, which is marked with the access counter value N. At step 537 is checked if there are any cache lines whose adjoin access counter has value N. If there is such a line, the next cache line whose access counter has value N is selected for eviction in step 540. If there is no cache lines whose paired access counter has value N, the control flow continues to step 547, and selects the next line for replacement using some of standard replacement policies, such as round-robin, or some other replacement policy.

At step 550, the selected line is allocated, a L3 request for accessing requested data is issued, and the access counter of the cache line is cleared. At step 560, control waits until requested data are received from the L3 cache. When requested L3 data cache line has arrived, the cache line is stored in the allocated prefetch cache line, the requested L1 data cache line is sent to the L1 data cache, and the access counter of the line is incremented at step 565. The control proceeds to step 510.

Figure 5:
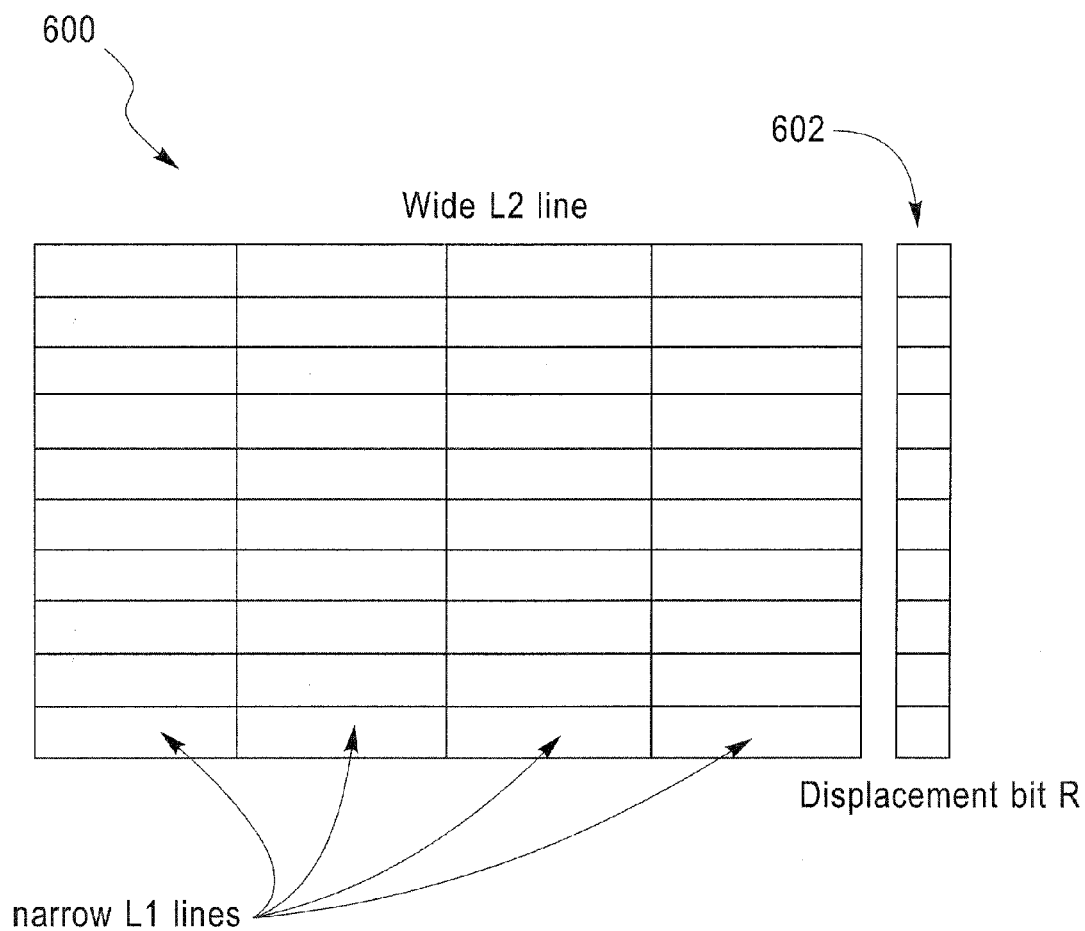
FIG. 5 depicts an alternative embodiment of the invention, where a single bit R is added to each L2 prefetch cache line.

Referring now to the FIG. 5, a second embodiment of the invention is depicted. To each cache line in the prefetch cache 600 is added a single displacement bit R 602. Each cache line has M L1 data cache lines. A cache line will be accessed several times. When the last M-th L1 cache line data portion of the cache line is accessed, the displacement bit R is set. A line with the M-th L1 cache line data portion accessed will probably not be accessed any more, and this line can be evicted without any performance loss. The reason for this selection is that the vast majority of access streams found in applications are ascending. When the displacement bit R is set indicating that the M-th L1 cache line is accessed, where M is the number of L1 data cache lines contained in a single prefetch cache line, this line can be evicted out of the cache. Thus, the next time a new request is generated, and a cache line has to be allocated for new data, a line whose displacement bit R is set can be replaced.

Figure 6:
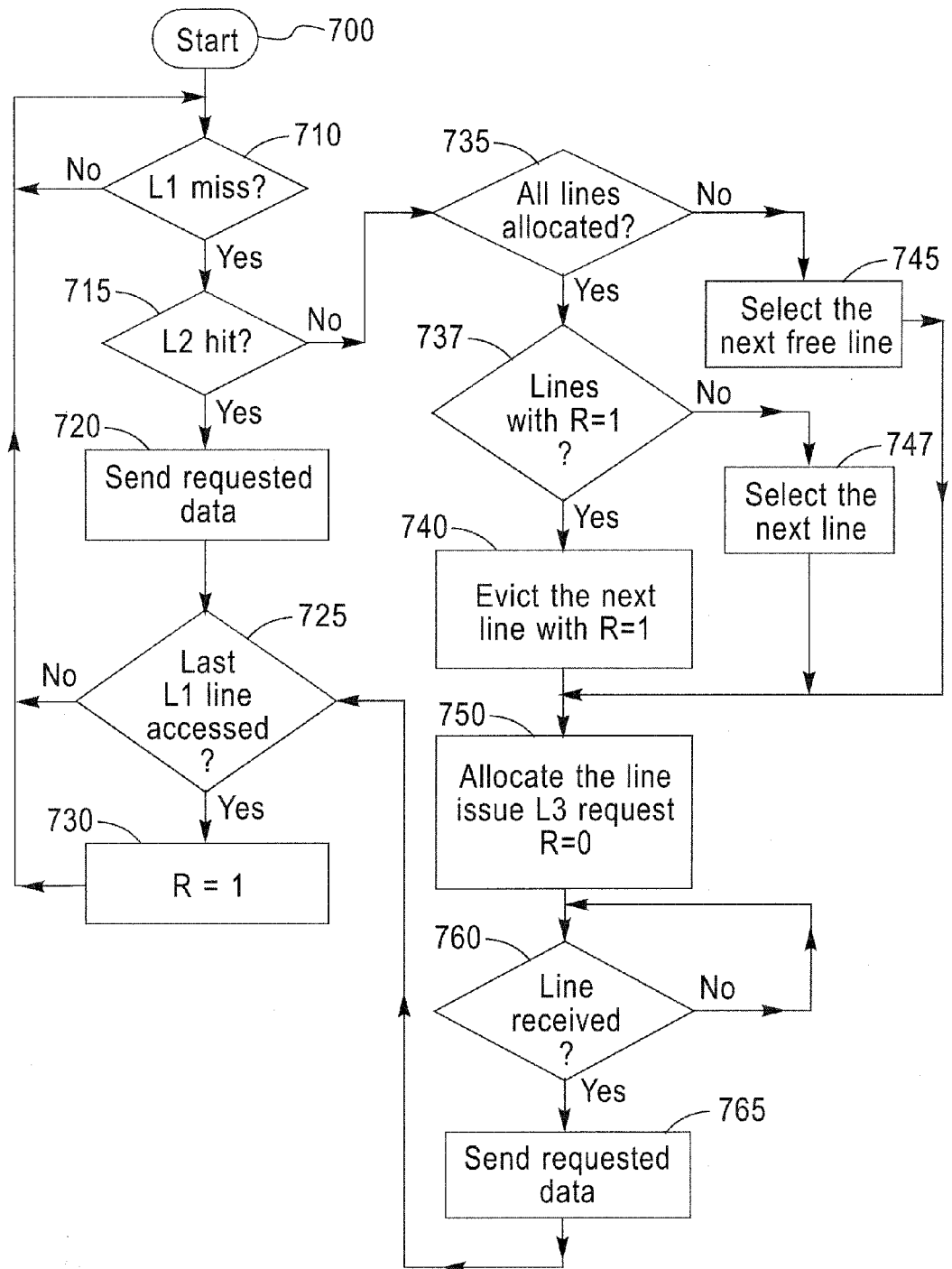
FIG. 6 depicts a flow chart for managing cache line accesses and updating access counters in accordance with the embodiment of the invention shown in FIG. 5.

Referring now to FIG. 6, the flow chart depicts the replacement policy using the embodiment of the invention shown in FIG. 5. At the start of operation at step 700, the prefetch cache waits for L1 cache misses in the step 710. The control stays in this state, until there is a L1 cache miss, when the execution proceeds to step 715.

In step 715, it is checked if the requested data are located in the prefetch cache. If requested data are located in the L2 prefetch cache, the execution continues to step 720. The requested L1 cache line is sent to the L1 data cache. Each prefetch cache line holds M L1 data cache lines. It is checked if the requested data was the M-th L1 data cache line in step 725. If the M-th L1 data cache line is accessed, the displacement bit R is set at step 730. Once the displacement bit R is set, the control loops back to the step 710 to wait for the next L1 data cache miss.

Going back to step 715, if requested data are not located in the prefetch cache, i.e., if this was an L2 miss, the execution proceeds to step 735 to determine if all prefetch cache lines are in use. If there is available an unused cache line in the prefetch cache, the first next free cache line is selected in step 745, and the execution continues to step 750.

If all cache lines are in use, one of the used cache lines has to be evicted. Ideally, evicted is the cache line which will not be used any more, which is marked with displacement bit R set. At step 737 is checked if there are any cache lines with displacement bit R set. If there is such a line, the next cache line whose displacement bit R is set is selected for eviction in step 740. If there is no cache lines whose paired displacement bit R is set, the control flow continues to step 747, and selects the next line for replacement using some of standard replacement policies, such as round-robin, or some other replacement policy.

At step 750, the selected line is allocated, a L3 request for accessing requested data is issued, and the displacement bit R of the cache line is cleared. At step 760, control waits until requested data are received from the L3 cache. When the requested L3 data cache line has arrived, the cache line is stored in the allocated prefetch cache line, the requested L1 data cache line is sent to the L1 data cache at step 765. The control proceeds to step 725 to determine if the last L1 data cache line in the cache line was accessed.

As will be readily apparent to those skilled in the art, aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Aspects of the invention, can also be embodied in a computer program product, which comprises all the respective features enabling the implementation of methods described herein, and which—when loaded in a computer system—is able to carry out those methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computing environment having a processing unit, first level cache, pre-fetch cache apparatus forming a second level cache, and a third level cache, said pre-fetch cache apparatus comprising:
    a plurality of data lines to store cache data, each storing data from the third level cache;
    a plurality of counters, each data line of the plurality of data lines associated with a respective one counter;
    means to determine if requested data are in the pre-fetch cache apparatus, means to send said requested data to the first level cache when requested data is in the pre-fetch cache apparatus, and means to increment the one counter associated with the data line that contains the requested data, when requested data is in the pre-fetch cache apparatus;
    means to determine if any one of the plurality of counters associated with the plurality of data lines in the pre-fetch cache apparatus reached a given value; and
    means to evict data from one data line associated with said one of the counters which reached a given value; and
    wherein the given value of a counter associated with one of the data lines which marks said one data line as a candidate for eviction is determined during pre-fetch cache operation by a stream detection engine.

2. The pre-fetch cache apparatus as claimed in claim 1, wherein for each of said plurality of data lines, the pre-fetch cache apparatus further comprises:
    means for resetting said one of the counters to a reset value; and
    means for incrementing said one of the counters by one when requested data are received from the third level cache, and a requested data portion is sent to the processing unit.

3. The pre-fetch cache apparatus as claimed in claim 1, wherein the value of a counter associated with one of the pre-fetch cache data lines which marks said data line as a candidate for eviction is encoded in hardware.

4. The pre-fetch cache apparatus as claimed in claim 1, wherein the value of a counter associated with one of the pre-fetch cache data lines which marks said data line as a candidate for eviction is implemented as a programmable register which is written by a processor.

* * * * *